Sept. 2, 1969　　　A. J. MOSES　　　3,465,256
SHAFT POSITION INDICATOR CIRCUIT FOR A SYNCHRO-TRANSMITTER
Filed May 16, 1967　　　3 Sheets-Sheet 1

INVENTOR.
ADRIAN J. MOSES
BY
ATTORNEY

INVENTOR.
ADRIAN J. MOSES
ATTORNEY

INVENTOR.
ADRIAN J. MOSES

United States Patent Office 3,465,256
Patented Sept. 2, 1969

3,465,256
SHAFT POSITION INDICATOR CIRCUIT FOR A SYNCHRO-TRANSMITTER
Adrian J. Moses, Rush City, Minn., assignor to Honeywell Inc., Minneapolis, Minn., a corporation of Delaware
Filed May 16, 1967, Ser. No. 638,961
Int. Cl. H03k 9/06; H03d 13/00
U.S. Cl. 328—133                 7 Claims

ABSTRACT OF THE DISCLOSURE

Circuitry for electronically converting three wire signals from a synchro-transmitter into a variable amplitude analog output indicative of shaft position of the transmitter. The circuitry utilizes switching, limiting and summing techniques such that the amplitude of the individual received signals are never passed to the summing network at greater than the amplitude obtained by the input signal at the 30° level. Due to the switching, there is always one signal varying in amplitude which is combined with the remaining, limited signals to produce the output signal.

---

The normal way to convert information from a synchro-transmitter to an analog output is to utilize a synchro-receiver which has an output shaft connected to a rotating potentiometer. However, it is sometimes undesirable to utilize the extra weight provided by a synchro-receiver. Attempts have been made to utilize the three signals and thus provide electronically an analog output indicative of shaft position of the transmitter. However, as will be realized, the sine wave signals are relatively linear only in the plus or minus 30 degree range of the signal. Therefore, large amounts of inaccuracy are produced in the converting apparatus when utilizing a demodulation process of one of the signals to produce the output which is indicative of shaft position.

The present invention utilizes a switching technique and a limiting system for the signals such that signals are combined to produce an output and wherein the amplitude of the signals never increases above the amplitude obtained at the 30 degree level. Further, due to the switching, there is always one signal varying in amplitude and it is the combined amplitudes of all the signals involved that produces the output signal.

It is therefore an object of the present invention to provide improved conversion circuitry for electronically converting the outputs of a synchro-transmitter to an analog signal indicative of shaft position of the synchro-transmitter.

Other objects and advantages of the present invention will be apparent from a reading of the specification and appended claims in conjunction with the drawings wherein:

Figures 1, 5:
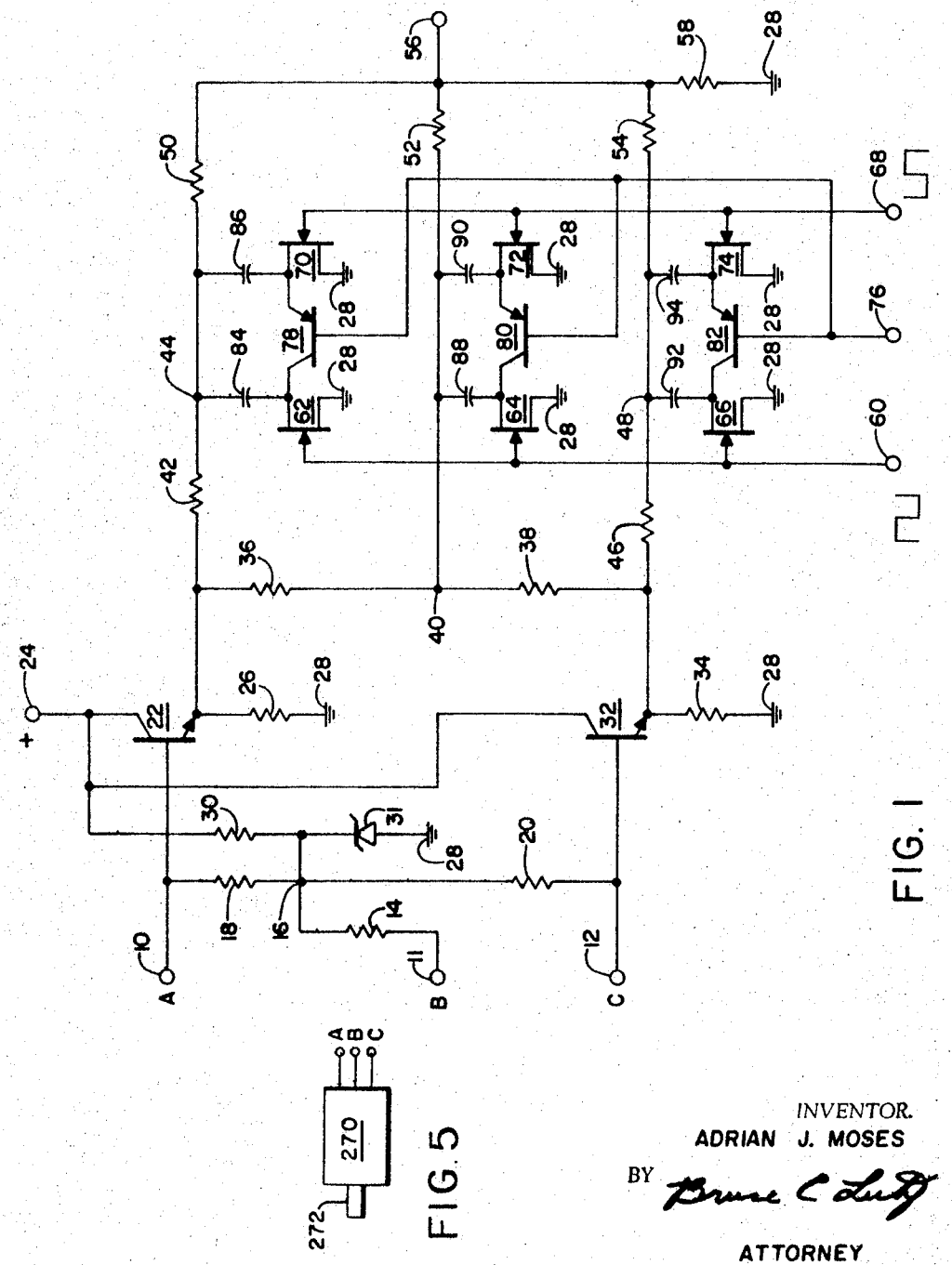
FIGURE 1 is a circuit diagram of a plus and minus 90 degree converter embodiment of the invention.
FIGURE 5 is a representation of a synchro transmitter.

In FIGURE 1 input terminals 10, 11 and 12 provide input signals to the apparatus which will be referred to respectively as signals A, B, and C. These signals may be received from a synchro-transmitter. A resistance 14 is connected between terminal 11 and a junction point 16. A resistor 18 is connected between input terminal 10 and junction point 16. A resistor 20 is connected between junction point 16 and terminal 12. An NPN transistor or current amplifying means 22 has a base connected to terminal 12, a collector connected to a source of positive power at a terminal 24 and an emitter connected through a resistor 26 to reference potential or ground 28. A resistor 30 is connected between the collector of transistor 22 and junction point 16. A Zener diode 31 is connected between junction point 16 and ground 28 and has an anode connected to ground 28 so that the Zenering action is from junction point 16 to ground. An NPN transistor or current amplifying means 32 has a base connected to input 12, a collector connected to positive terminal 24 and an emitter connected through a resistor 34 to ground 28. A pair of resistors 36 and 38 are connected in series and have a junction point 40 therebetween. The series combination is connected between the emitters of transistors 22 and 32. Signals A and C are amplified by transistors 22 and 32 respectively and appear at the emitters thereof. The two resistors 36 and 38 combine these two signals and produce a resultant signal at junction point 40 which is the inverse of signal B or hereafter designated $\bar{B}$. A resistor 42 is connected between the emitter of transistor 22 and a junction point 44. A resistor 46 is connected between the emitter of transistor 32 and a junction point 48. Resistors 50, 52, and 54 each have one end connected to an output terminal 56 and have the other ends connected respectively to junction points 44, 40, and 48. A resistance means 58 is connected between output terminal 56 and ground 28. An input terminal 60 supplies a signal of a first phase to the gates of three transistors 62, 64, and 66. These transistors are field effect transistors and will be designated as FET's by future reference. Each of these transistors has the drain connected to ground 28. Another input terminal for providing a switching signal of a phase opposite that supplied by terminal 60 is designated as 68 and is conneced to the gates of three FET's 70, 72, and 74. Again, each of these FET's has the drain connected to ground 28. A source of reference potential voltage for setting the value of limiting is provided from terminal 76 which is connected to the bases of three PNP transistors designated respectively as 78, 80, and 82. Transistor 78 has the collector and emitter connected respectively to the source of FET 62 and the source of FET 70. Transistor 80 has its collector and emitter connected in a similar fashion to FET 64 and FET 72 while transistor 80 is similarly connected to FET 66 and 74. A capacitor 84 is connected between junction point 44 and the source of FET 62 while a further capacitor 86 is connected between junction point 44 and the source of FET 70. A capacitor 88 is connected between junction point 40 and the source of FET 64 while a further capacitor 90 is connected between junction point 40 and the source of FET 72. A capacitor 92 is connected between junction point 48 and the source of FET 66 while a further capacitor 94 is connected between junction point 48 and the source of FET 74.

Figures 2, 4:
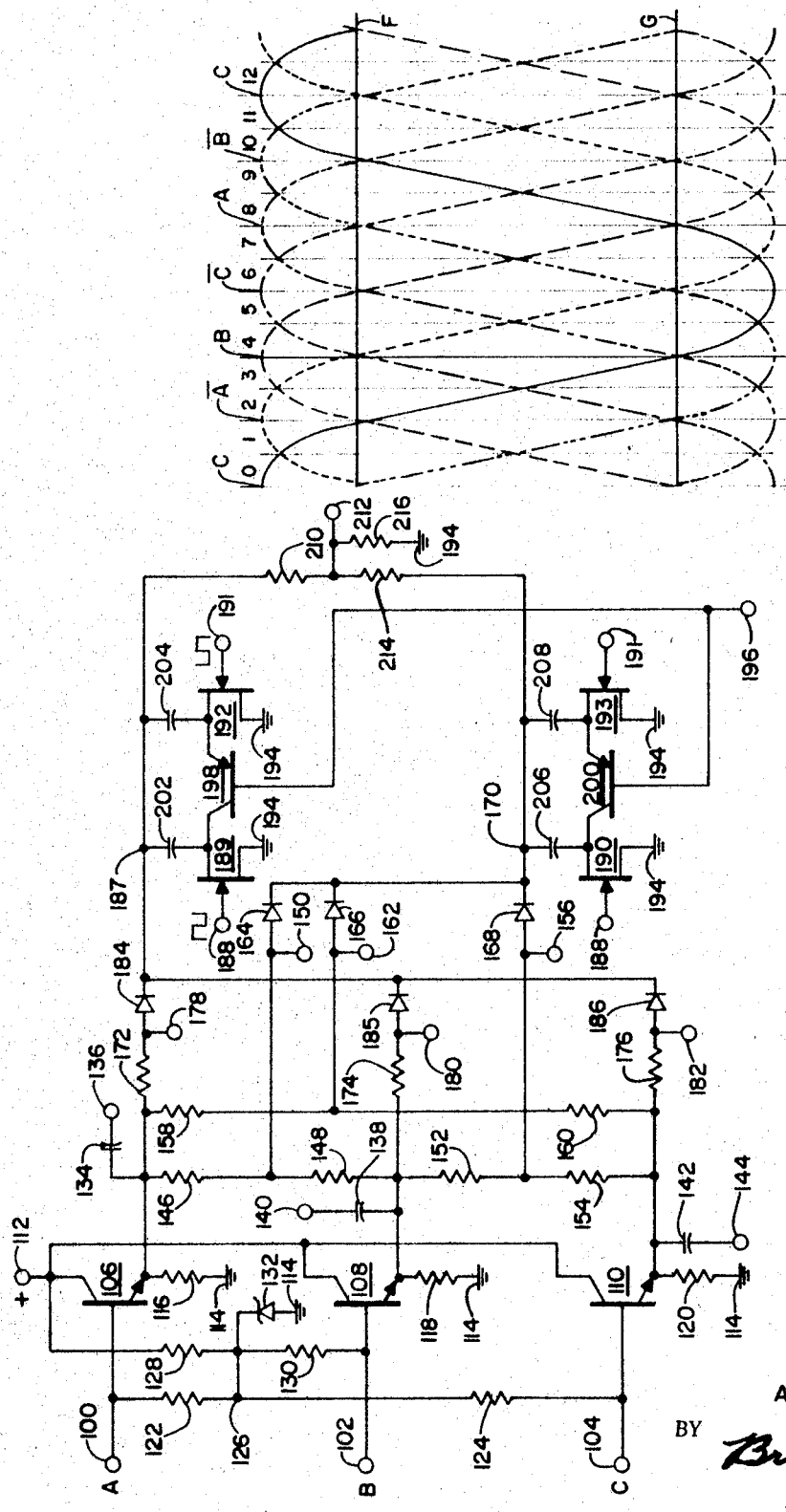
FIGURE 2 is a portion of the circuitry for providing 360 degree conversion of the output signals of the transmitter.
FIGURE 4 is a wave form diagram of the signals at various points within FIGURE 2.

In FIGURE 2 input terminals 100, 102, and 104 are connected to receive respectively input signals of a phases A, B, and C in the same manner as are the terminals 10, 11, and 12 of FIGURE 1. These input terminals are connected to the bases of three transistors 106, 108 and 110 respectively. Each of these transistors has the collector connected to a source of positive potential at terminal 112 while each of the emitters are connected to ground 114 through resistance means 116, 118 and 120 respectively. Terminals 100 and 104 are connected together through a pair of series connected resistors 122 and 124 having a junction point 126 therebetween. A resistor 128 is connected between power terminal 112 and junction point 126 while a resistor 130 is connected between junction point 126 and input 102. A Zener diode 132 is connected between junction point 126 and ground 114 such that the Zenering action is obtained from junction point 126 to ground. An emitter of transistor 106 is connected through a capacitor 134 to an output terminal 136 for supplying an amplified version of signal A to three inputs of FIGURE 3. The emitter of transistor 108 is similarly connected through a capacitor 138 to an output terminal 140 for supplying phase B to FIGURE 3. Also, the emitter of transistor 110 is connected through a capacitor 142 to an output terminal 144 for supplying phase C to three terminals of FIGURE 3. A pair of resistors 146 and 148 are connected in series between the emitters of transistors 106 and 108. A grounding input terminal 150 is connected to a junction between the last-mentioned resistors. Input 150 is allowed to be open or grounded depending upon the state of the input signals supplied to FIGURE 3. A pair of resistors 152 and 154 is connected in series between the emitters of transistors 108 and 110 and an input terminal 156 is connected to a junction therebetween. A pair of resistors 158 and 160 are connected in series between the emitters of transistors 106 and 110 and an input terminal 162 is connected to a junction therebetween. Three diodes 164, 166, and 168 are connected together at their cathodes to a junction point 170 while their anodes are connected respectively to inputs 150, 162, and 156. In all references to diodes in this specification, the direction of easy current flow will be assumed to be from anode to cathode. This assumption is based on conventional current theory. Resistors 172, 174 and 176 are connected respectively at one end to the emitters of transistors 106, 108 and 110 and at the other end are connected respectively to input terminals 178, 180 and 182. All the terminals 156, 162, 178, 180 and 182 are either grounded or open as explained with respect to terminal 150 depending upon the conditions of the input signals supplied to FIGURE 3. Further, the similar terminals in FIGURE 3 will be designated with the same number as used in FIGURE 2 with the addition of one or more primes: Diodes 184, 185, and 186 have their cathodes connected together and to a junction point 187 while their anodes are connected respectively to terminals 178, 180 and 182. A source of alternating input potential 188 is connected to the gates of two FET's 189 and 190 respectively. A source of alternating signal of a phase opposite to that supplied to 188 is received at input 191 and is supplied to the gates of FET's 192 and 193. Each of the last four mentioned FET's has a drain connected to ground 194. A source of voltage reference 196 is connected to the bases of two PNP transistors 198 and 200. The collector and emitter of transistor 198 are connected to the sources of FET's 189 and 192 respectively. The collector and emitter of transistor 200 are connected to the sources of FET's 190 and 193 respectively. Two capacitors 202 and 204 are connected together at one end and at the other end are connected to the sources of FET's 189 and 192 respectively. Two more capacitors 206 and 208 are connected together at one end and are connected at the other end to FET's 190 and 193 respectively. While the last-mentioned capacitors are shown as capacitor units, they may be other energy storage means in some embodiments of the invention. Further, the previously mentioned capacitors 134, 138 and 142 are merely isolation devices and could be replaced by other types of isolation means. As will be realized, the diodes are merely unidirectional current control devices as are the transistors 198 and 200. The FET's are merely used as switches in all figures of the specification. While all the resistive means or impedance means have been referred to merely as resistors, the other designations are applicable. A resistor 210 is connected between junction point 187 and an output terminal 212. A resistor 214 is connected between junction point 170 and output terminal 212. A resistor 216 is connected between output terminal 212 and ground 194.

Figure 3:
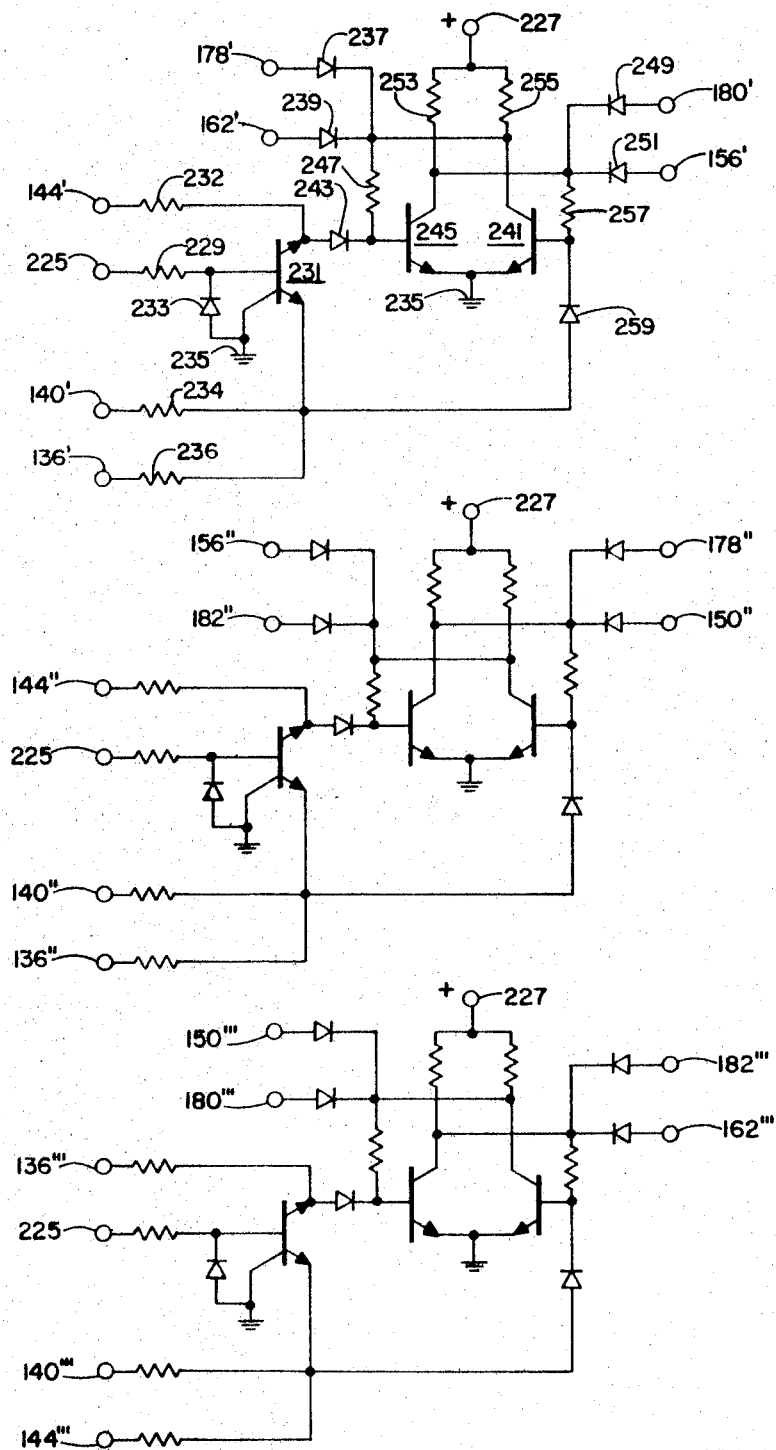
FIGURE 3 is the logic circuitry for use with FIGURE 2 to provide a switching so as to combine the proper input signals to the output terminal.

In FIGURE 3 there are three identical circuits shown in the upper, middle and lower portions thereof. Each of the identical circuits has terminals which are connected to various portions of FIGURE 2 and are identified by the same number with a prime in the case of the upper figure, with a double prime in the case of the middle figure and with a triple prime in the case of the lower figure. Each of the circuits has an input terminal 225 which is connected to a signal source of a reference phase. Further, each of the circuits has the terminal 227 which is connected to a source of positive potential. Since each of these circuits is identical, only the parts of the upper circuit will be given numbers for the purposes of explanation since each of the lower circuits operates identically. A resistor 229 is connected between input 225 and a base of a double emitter transistor of the NPN type polarity 231. One emitter is connected through a resistor 232 to input terminal 144', while the other emitter is connected through a resistor 234 to input terminal 140'. A resistor 236 is connected from termial 136' to the same emitter as is connected the resistor 234. A diode 233 has the cathode connected to the base of transistor 231 while the anode is connected to ground 235. The collector of transistor 231 is also connected to ground 235. A pair of diodes 237 and 239 have their cathodes connected to a collector of a NPN transistor or grounding switch 241 which has its emitter connected to ground 235. The anodes of the diodes 237 and 239 are connected to input terminals 178' and 162' respectively. A diode 243 is connected between the end of resistor 232 which is connected to the emitter of transistor 231 and a base of a NPN transistor or switch generally designated as 245. The cathode of diode 243 is connected to the base of transistor 245. A resistor 247 is connected between the collector of transistor 241 and the base of transistor 245. A pair of diodes 249 and 251 have their cathodes connected to the collector of transistor 245 while their anodes are connected respectively to input termials 180' and 156'. A pair of resistors 253 and 255 have one end connected to power source 227 while the other ends are connected respectively to the collectors of transistors 245 and 241. The emitter of transistor 245 is connected to ground 235. A resistor 257 is connected between the collector of transistor 245 and the base of transistor 241. A diode 259 has the anode thereof connected to the second emitter of transistor 231 and the cathode connected to the base of transistor 241.

FIGURE 4 is a diagram of the wave forms of the demodulated portions of the signsl A, B, and C and also of the inverse of each of these signals A, B, and C. The inverse as previously stated will be designated as the signal with a dash thereabove. In other words $\overline{A}$, $\overline{B}$, and $\overline{C}$. The wave forms are further divided on a time basis such that there are 12 time periods and each period includes a 30° segment of each of the wave forms starting at the 0° point. Starting with the signal $\overline{A}$ which peaks between time periods 1 and 2, the remaining signals are successively B, $\overline{C}$, A, $\overline{B}$ and C. Thus, time period 1 includes the signal $\overline{A}$ from 60° to 90°, signal B from 0 to 30°, signal C from 120° to 150°, signal $\overline{C}$ from 300° to 330°, signal A from 240° to 270° and finally signal $\overline{B}$ from 180° to 210°. Lines F and G are utilized to designate the amplitudes at which the limiters to be later described limit the signal being applied to the output. As will be realized, the amplitude limiters prevent the amplitude of the signal being applied to the output from ever increasing beyond the amplitude that they would have at 30°. F is the amplitude limitation in the positive direction while G is the amplitude limitation in the negative direction. Both of the amplitudes are of the same absolute magnitude and merely opposite in polarity. As will be realized, all the signals from a synchro-transmitter are of the same frequency and it is merely their peaks or the envelope thereof which produces the designated signals A, B, and C. Thus, the signals A, B, and C are of a much lower frequency than is the frequency of the applied signal. Thus, while the discussion will designate the envelopes A, B, and C as signals for convenience, in actuality, the signal is a high frequency signal which produces these envelopes.

In FIGURE 5 a synchro-transmitter generally designated as 270 has a shaft 272 and output terminals A, B and C which correspond to the similar designations in the remaining figures. In other words, rotation of shaft 272 will provide variable amplitude output signals corresponding at any instant in time to that shown in FIGURE 4. The output terminals would of course be connected as inputs to the circuitry of FIGURES 1 and 2.

Operation

In explaining the operation of FIGURE 1 it will be noted that the FET 62 and 70 along with transistor 78 and capacitors 84 and 86 comprise a limiting circuit substantially the same as that shown in my copending application Ser. No. 637,827, filed May 11, 1967. Reference may be had to the afore-mentioned application for a more complete description of operation of the limiters. However, it may be briefly determined that the two FET's 62 and 70 are turned ON in alternate half cycles of the input signal which is either in phase or exactly out of phase with the signal to be limited. This causes capacitors 84 and 86 to become charged in opposite directions with respect to junction point 44. When the total charge on the two capacitors 84 and 86 exceeds the level of the reference voltage applied to 76, transistor 78 will break down and there will be a discharge of the capacitors through transistor 78 until the total voltage on the two capacitors merely equals the reference voltage.

FIGURE 1 in general illustrates a plus and minus 90° converter which provides an analog output signal indicative in amplitude of the shaft position of a synchro-transmitter. In other words, FIGURE 1 is utilized to replace a synchro-receiver.

Referring to FIGURE 4, it will be noted that during time periods 6 and 7 signal $\overline{B}$ is varying from −30° to +30°. During this same time period signal A is always more positive than amplitude F while phase C is always more negative than amplitude G. In other words, each of these signals exceed the amplitude at the 30° point. As previously explained, $\overline{B}$ is the inverse of signal B as may be easily determined from observing the wave forms in FIGURE 4. If the three signals are applied to the designated inputs, signals A and C will appear at the emitters of transistors 22 and 32 respectively. Phase B, while not necessary for the purposes of operation of the converter, is utilized to provide a reference by being connected to the mid-point of resistors 18 and 20 and from there to ground 28 through Zener diode 30. This allows the signals to be stabilized and to operate with reference to a fixed rather than a floating potential. Referring back to FIGURE 4, it will be noted if signals A and C are summed, signal $\overline{B}$ will be the composite resultant signal. As will be realized, unless proper precautions are taken, signal $\overline{B}$ will be of a different amplitude. However, by adjusting the values of resistors 36 and 38, the signal $\overline{B}$ can be obtained at junction point 40. Each of the signals A, $\overline{B}$ and C are summed through resistors 50, 52, and 54 to the output 56. However, if any of the signals exceed the amplitudes F or G, they will be limited by their respective limiting circuits before being summed to the output. Referring again to FIGURE 4, it is to be realized that the envelopes shown in FIGURE 4 are the envelopes of the signals obtained from the synchro-transmitter as demodulated with respect to a given reference phase. Thus, when the reference phase and the signal from the transmitter are the same phase, the resultant output is positive. When they are of the opposite phase the resultant output is negative, with respect to a central point which for the purposes of this specification will be called zero degrees. As will be noted, the division between time periods 6 and 7 occurs at the zero degree point of signal $\overline{B}$. At this same time, signals A and C are limited and are of the opposite polarity and if these two signals are summed through resistors 50 and 54, the resultant output at 56 will be zero volts magnitude. Further, since signal $\overline{B}$ at this same point in time is of zero magnitude the net result at output 56 is zero. If the synchro rotates such that the signal $\overline{B}$ increases in amplitude, the output at 56 will slowly increase in amplitude up to 30°. At this point, both signals A and $\overline{B}$ will be limited in the positive direction and signal C will start decreasing in amplitude from the negative polarity toward zero amplitude. Thus, since signal C is subtracting less of the signal from the effect of signal A, the output at 56 continues to increase. This output will continue to increase until the time period marked as the end of time period 9 at which time all three signals will be limited and all will be of the maximum potential allowed by the three limiting circuits. As can be observed, in time period 10 the amplitude of signal A decreases and thus the output at 56 would decrease. Therefore, the circuit is not usable for an increase in the positive direction of greater than 90° or in other words the time period designated by time period 7, 8 and 9. As will be observed the results of rotating the synchro-transmitter in the opposite direction will result in the output signal providing the opposite phase output and increasing in amplitude until the end of time period 4 occurs. At this time the output will start decreasing in amplitude and thus the total operational capability of FIGURE 1 is from time periods 4 through and including 9 or in other words, plus and minus 90°.

To explain the operation of FIGURE 2, FIGURES 2 3, and 4 will have to be consulted. In operating FIGURE 2 it is to be realized that the various inputs for providing grounding signals are operated in accordance with the signals A, B, and C so as to provide two signals to be summed by summing resistors 210 and 214 to provide the output signal. Referring to FIGURE 4 it may be determined that with the connections shown that for time period 1 the signals being summed are signals B, and $\overline{C}$. During time 2 it is the same two signals. However, for the time period 1 signal B is varying in amplitude while during time period 2 signal $\overline{C}$ is varying in amplitude. At the junction between time periods 2 and 3, switching occurs so that signal B is switched out and signal A is switched in. Signal A is, of course limited until the start of time period 4 at which time signal $\overline{C}$ is limited and signal A varies in magnitude.

Referring to the upper circuit of FIGURE 3 it can be seen that if a positive signal is applied to terminal 225, transistor 231 will turn ON and effectively ground the anodes of the two diodes 243 and 259. Thus, none of the input signals A, B, or C can be applied to the bases of the respective transistors 245 or 241. As will be further realized, the signals A and B are summed to produce a signal applied to the anode of diode 259 which is indicative of $\overline{C}$. Since signals C and $\overline{C}$ are of the opposite phase with respect to the reference, one of the signals has to be positive while the other one is negative. Thus, it can be determined that every half cycle the two inputs to the transistors 245 and 241 are grounded due to the action of the signal applied to 225 and the following half cycle one of the inputs is made positive while the other input is made negative. It may be assumed that the signals are as shown in FIGURE 4 for time period 1. Under these conditions during the negative half cycle of the signal 225, signal $\overline{C}$ is positive and thus results in the grounding of the collector of transistor 241 and accordingly grounding the terminals 162 and 178 in FIGURE 2. As was previously mentioned, $\overline{C}$ is the resultant obtained by summing the signals A and B. Referring to the other portions of FIGURE 3, it will be realized that during time period 1 $\overline{B}$ is also positive when the reference is negative and thus terminals 156 and 182 are grounded as are terminals 162 and 182. It will be noted that terminals 182 and 156 are each grounded by two different circuits. This does not interfere with the operation of the gating circuitry. While one grounding circuit is sufficient, two grounding circuits will not produce any harmful results. Thus, during time period 1 terminals 150 and 180 are left open so that signals $\overline{C}$ and B are provided at the output terminal 212 of FIGURE 2. During time period 2 the same two signals are applied to the output. However, referring back to time period 1, it will be noticed that signal B is varying in amplitude while signal $\overline{C}$ is limited. During time period 2, signal $\overline{C}$ is varying while signal B is now limited. Upon entering time period 3, signal C changes polarity so that terminals 156 and 180 are grounded instead of terminals 152 and 178. This results in outputs of signals A and $\overline{C}$ being obtained. Thus, during time period 3, signal A is limited in amplitude while signal $\overline{C}$ varies in amplitude in a positive direction toward the 30° point.

This process can be followed through with the various wave forms to determine that in time periods 5, 7, 9 and 11, the terminals 162 and 178; 182 and 162; 156 and 182; and 180 and 156 respectively are left open and ungrounded. Thus, during time period 5 the output signals are $\overline{B}$ and A, during time period 7 the output signals are C and $\overline{B}$, during time period 9 the output signals are $\overline{A}$ and C and, finally, during time period 11 the output signals are B and $\overline{A}$.

As will be obvious to one skilled in the art, logic circuitry can be set up to take the outputs from the circuit shown in FIGURE 3 and determine which 30° segment the synchro-transmitter is operating within. Since it is possible to perform this function in many different ways and further since it is not important to the concept of the invention, this logic circuitry has not been shown.

What has been shown by this specification is the concept of combining two signals so that each one provides a variable amplitude output of opposite phases for the first and last 30° segments of a 60° measuring period. Further, during each 60° measuring period, the variable amplitude signal is combined with two different amplitude limited signals. It is combined first with one amplitude limited signal during the first 30° portion when it is of one phase at the output and it is combined with a second signal which is amplitude limited during the opposite phase and remaining 30° portion. However, once a signal is being utilized and summed with one or more other signals at the output it remains in the circuit for a total of 120 electrical degrees.

To summarize the operation of FIGURE 2 in view of the complexity of the previous explanation, it is to be realized that three signals labeled A, B and C are obtained from a synchro-transmitter. These are applied through the respective transistor amplifiers 106, 108, and 110. Further, these various signals are connected together and through a Zener diode 132 to ground 114 for the purposes of providing a stable reference from which to judge the amplitudes of the various signals. After current amplification, each of these signals is supplied through the terminals 136, 140 and 144 respectively to the various identical circuits of FIGURE 3 which perform logic function to switch various signals in and out of the circuit at the appropriate times during the revolution of the shaft of the synchro-transmitter. The limiting circuits utilizing the FET's are always in operation and will limit any signal when it reaches an amplitude which is greater than the predetermined amounts shown as F and G in FIGURE 4. The signals are amplitude controlled such that the limiting occurs only when the amplitude of the signal exceeds the amplitude reached at the 30° point. Thus, during time period 1 signal $\overline{C}$ is limited but signal B is not. During time period 2 signal B is limited while signal $\overline{C}$ is able to vary and is not limited in amplitude.

Two embodiments of the present invention have been shown wherein one is able to operate over plus or minus 90° of the possible rotation of the shaft of the synchro-transmitter and the other is able to operate over 360° of shaft rotation of the synchro-transmitter due to the switching circuitry incorporated therein to allow only two signals to be summed at any given point in time and applied to the output to 12. The two embodiments practice the same invention and, in fact, FIGURE 1 becomes obvious in view of FIGURE 2 since the teachings of the invention is the utilization of the relatively straight portion of the signal envelopes. That is, the portion from minus 30° to plus 30° of the signal envelope. During this portion the amplitude change is relatively linear with respect to shaft position. After 30°, the amplitude changes are no longer linear and the signal is hard to convert to a linearly changing analog output signal.

While two embodiments have been shown, it is believed obvious that other embodiments can be produced utilizing the teachings of my invention which is to provide an output which varies in linearly amplitude in an analog fashion due only to the component of a signal from the transmitter which is within a plus or minus 30° range so that the output changes linearly with shaft position and after the 30° point is reached this signal is limited and summed with another signal which is varying with the plus or minus 30° range.

Therefore, I do not want to be limited by the embodiments shown but only by the scope of the appended claims wherein I claim:

1. Apparatus for converting three input signals from a synchro-transmitter to a single signal which varies in amplitude as a function of shaft position of the synchro-transmitter comprising, in combination:
   input means for receiving at least two of the three output signals supplied by a synchro-transmitter;
   means, including first and second outputs, connected to said input means for providing as a first output a signal indicative of one of the two received signals and for providing as a second output a composite signal, obtained by summing the two received signals, indicative of the inverse of the remaining signal supplied by the transmitter;
   means for limiting signals passing therethrough from becoming greater than a predetermined amplitude at an output thereof;
   apparatus output means for providing a variable amplitude output signal indicative of shaft position of the synchro-transmitter; and
   means connecting said means for limiting signals between said outputs of said second named means and said apparatus output means for supplying a variable amplitude summed output signal to said apparatus output means indicative of the summation of at least one unlimited and one limited signal.

2. Apparatus as claimed in claim 1 wherein the three output signals from the synchro-transmitter have amplitude envelopes which vary as a sine function of shaft position and which differ in phase from each other by 120°.

3. Apparatus as claimed in claim 2 comprising in addition a third output in conjunction with said means connected to said input means, for providing as a third output a signal indicative of the other of said two received signals; and means connecting said limiting means also to said third output.

4. Apparatus as defined in claim 3 wherein said limiting means comprises at least two limiting circuits and the signal at said apparatus output means is indicative of at least two limited and one unlimited signals.

5. Apparatus for converting two signals, of a single frequency whose amplitude envelopes vary as a sine function and whose envelopes are 120 electrical degrees apart, to a single alternating signal which varies in amplitude directly as a function of phase angle of the envelope of one of the two signals from a reference comprising, in combination:

first signal input means for receiving a first alternating signal of a given frequency having an alternating amplitude envelope which varies as a sine function of a given condition;

second signal input means for receiving a second alternating signal of the given frequency having an alternating amplitude envelope which varies as a sine function of the given condition, the envelope of the second signal being 120 electrical degrees out of phase with respect to the envelope of the first signal;

summing means connected to said first and said second input means for combining said first and said second signals to produce an ouput third signal having an alternating amplitude envelope intermediate the envelopes of said first and said second signals; and amplitude limiting means for summing received signals after limiting them to an amplitude of no greater than a predetermined value, said amplitude limiting means being connected to said summing means for receiving the third output signal therefrom and connected to at least one of said first and second signal input means for receiving therefrom the respective alternating signal, the resultant summed signal varying in amplitude directly as a function of phase angle of the envelope of one said first and second signals.

6. Apparatus as claimed in claim 5 wherein:

the envelopes of the first and second signals are of the same amplitude and the envelope of the third signal is the same amplitude as the envelopes of first and second signals and situated midway therebetween; and the amplitude limiting means is connected to receive both said first and said second signals, said limiting means limiting any of the received signals when the amplitude is greater than the amplitude of the signal when the envelope thereof is at 30 electrical degrees.

7. Apparatus for converting three signals whose amplitudes are equally out of phase with each other and each of which is indicative of a continuously recurring condition comprising, in combination:

first, second, and third input signal means for receiving first, second, and third input signals each responsive to the same condition, but having amplitudes 120° out of phase with each other and supplying same to respective outputs thereof;

fourth signal means connected between said second and third means for producing a fourth signal which is the inverse of said first signal at an output thereof;

fifth signal means connected between said first and third means for producing a fifth signal which is the inverse of said second signal at an output thereof;

sixth signal means connected between said first and second means for producing a sixth signal which is the inverse of said third signal at an output thereof;

first summing means, including first signal amplitude limiting means, connected to said outputs of said first, second and third signal means for providing at an output thereof a signal indicative of any received signals but limited in amplitude to the amplitude of the envelope of the signal at 30°;

second summing means, including second signal amplitude limiting means, connected to said outputs of said fourth, fifth, and sixth signal means for providing at an output thereof a signal indicative of any received signals but limited in amplitude to the amplitude of the envelope of the signal at 30°;

logic means connected to said outputs of said first, second, third, fourth, fifth, and sixth signal means for permitting passage of a signal to said first summing means only when the amplitude envelope of the signal is between minus 60 degrees and plus 60 degrees and for permitting passage of a signal to said second summing means only when the amplitude envelope of the signal is between minus 60 degrees and plus 60 degrees; and third summing means connected to said outputs of said first and second summing means for receiving therefrom two signals, one of which is amplitude limited, and supplying at an output thereof a signal which varies in amplitude substantially linearly with the condition producing the three signals.

References Cited

UNITED STATES PATENTS

| | | | |
|---|---|---|---|
| 2,620,441 | 12/1952 | McCoy et al. | 328—127 X |
| 3,205,492 | 9/1965 | Young et al. | 318—30 X |
| 3,211,993 | 10/1965 | Golden et al. | 324—83 X |
| 3,351,952 | 11/1967 | Kobold et al. | 318—30 X |
| 3,375,508 | 3/1968 | Molnar et al. | 340—198 |

JOHN S. HEYMAN, Primary Examiner

U.S. Cl. X.R.

307—232, 237, 251; 318—30; 324—83; 340—198